US008745760B2

(12) United States Patent
Poulson

(10) Patent No.: US 8,745,760 B2
(45) Date of Patent: Jun. 3, 2014

(54) MALWARE CLASSIFICATION FOR UNKNOWN EXECUTABLE FILES

(75) Inventor: Steven Robert Poulson, London (GB)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 13/361,054

(22) Filed: Jan. 30, 2012

(65) Prior Publication Data

US 2013/0198841 A1   Aug. 1, 2013

(51) Int. Cl.
*G06F 21/10* (2013.01)
*G06F 15/173* (2006.01)

(52) U.S. Cl.
USPC ............................ 726/32; 707/999.1; 709/238

(58) Field of Classification Search
USPC ............................ 726/32; 707/999.1; 709/238
See application file for complete search history.

(56) References Cited

U.S. PATENT DOCUMENTS

| | | | | |
|---|---|---|---|---|
| 5,428,754 | A * | 6/1995 | Baldwin | 712/220 |
| 6,240,508 | B1 * | 5/2001 | Brown et al. | 712/219 |
| 7,694,150 | B1 | 4/2010 | Kirby | |
| 7,707,620 | B2 | 4/2010 | Cherepov | |
| 7,832,008 | B1 | 11/2010 | Kraemer | |
| 8,028,338 | B1 | 9/2011 | Schneider et al. | |
| 2005/0021491 | A1 * | 1/2005 | Horgan | 707/1 |
| 2005/0187947 | A1 * | 8/2005 | Wortendyke et al. | 707/100 |
| 2007/0169042 | A1 * | 7/2007 | Janczewski | 717/149 |
| 2010/0257507 | A1 * | 10/2010 | Warren | 717/106 |
| 2011/0219002 | A1 * | 9/2011 | Bartram et al. | 707/738 |
| 2011/0283361 | A1 * | 11/2011 | Perdisci et al. | 726/24 |

OTHER PUBLICATIONS

Edward Fredkin, "Trie Memory," Communications of the ACM, v.3 n.9, p. 490-499, Sep. 1960.
Jon Louis Bentley, "Multidimensional Binary Search Trees Used for Associative Searching," Communications of the ACM, v.18 n.9, p. 509-517, Sep. 1975.

* cited by examiner

*Primary Examiner* — Techane Gergiso
(74) *Attorney, Agent, or Firm* — Edell, Shapiro & Finnan, LLC

(57) ABSTRACT

Devices, methods and instructions encoded on computer readable medium are provided herein for implementation of classification techniques in order to determine if an unknown executable file is malware. In accordance with one example method, an unknown executable file comprising a sequence of operation codes (opcodes) is received. Based on the operation codes of the unknown executable, a subset of executable files in a training set is identified in which each of the files in the subset have the same beginning sequence of operation codes as the unknown executable. After the subset is identified, a feature set extracted from the unknown executable file is compared to one or more feature sets extracted from each of executable files in the identified subset. A determination is made, based on the feature set comparison, whether the unknown executable file is malware.

20 Claims, 5 Drawing Sheets

US 8,745,760 B2

MALWARE CLASSIFICATION FOR UNKNOWN EXECUTABLE FILES

TECHNICAL FIELD

The present disclosure relates to malware classification for unknown executable files.

BACKGROUND

A wide variety of executable malicious files or software (malware) exist that can attack and potentially harm modern computers. Malware may include, for example, computer viruses, worms, Trojan horse programs, spyware, adware, crimeware, etc. Modern malware is often designed to provide financial gain to the attacker and surreptitiously capture important information such as logins, passwords, bank account identifiers, and credit card numbers. Similarly, the malware can provide hidden interfaces that allow the attacker to access and control the compromised computer.

Systems and/or software for countering malware typically operate by seeking to classify a particular executable file as either malware or as a safe file before the file is executed, downloaded, saved, etc. In certain such classifications, aspects of the executable file may be compared to a dataset of other files to determine whether the file is a safe file or is malware. Due to the large number of different types of malware that exists, such datasets are extremely large and the comparison may be computationally expensive.

DESCRIPTION OF EXAMPLE EMBODIMENTS

Overview

Devices, methods and instructions encoded on computer readable media are provided herein for implementation of executable classification techniques in order to determine if an unknown executable file is malware. In accordance with one example method, an unknown executable file comprising a sequence of operation codes (opcodes) is received. A beginning sequence of the operation codes of the unknown executable file is sequentially compared to operation codes in nodes of a Trie data structure. This comparison identifies a subset of executable files in a training set that each has the same beginning sequence of operation codes as the unknown executable. After the subset is identified, a feature set extracted from the unknown executable file is compared to one or more feature sets extracted from each of executable files in the identified subset. A determination is made, based on the feature set comparison, whether the unknown executable file is malware.

Example Embodiments

Figure 1:
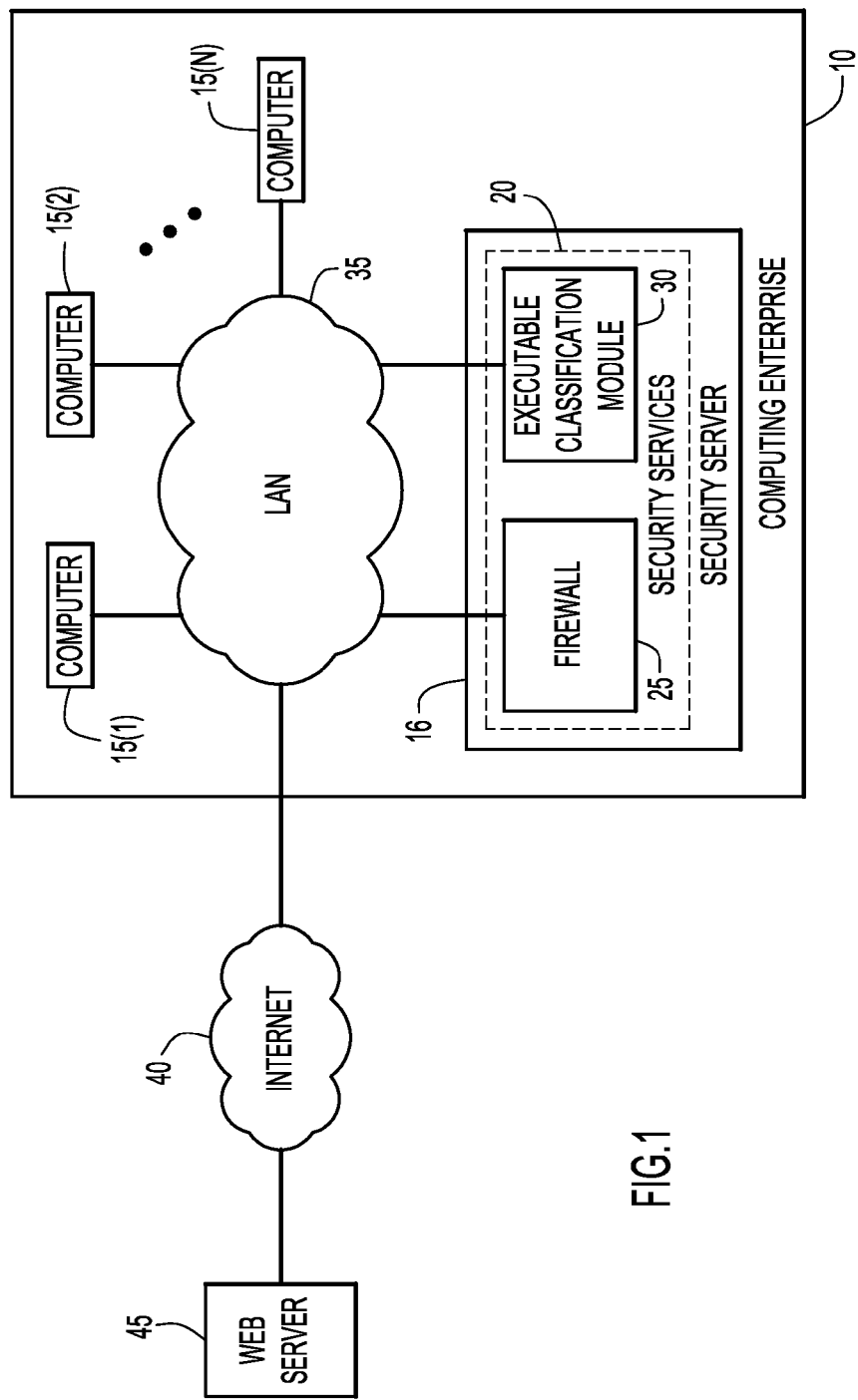
FIG. 1 is a block diagram of a computing enterprise configured to implement executable classification techniques in order to identify malware according to an example.

FIG. 1 is a block diagram of a computing enterprise 10 configured to implement classification of unknown executable files. Enterprise 10 comprises computers 15(1)-15(N) (e.g., desktop computers, laptop computers, tablet computers, mobile devices, etc.) and a security server 16 providing security services 20. Security services 20 comprise a firewall 25 and an executable classification module 30. Computing enterprise 10 also includes a local area network (LAN) 35 that includes one or more network elements such as, for example, routers, switches, load balancers, etc. For ease of illustration these additional network elements have been omitted from FIG. 1.

Computers 15(1)-15(N) are configured for communication with external third parties via LAN 35 and the Internet 40. FIG. 1 illustrates one example third party, namely web server 45, with which computers 15(1)-15(N) may communicate. Firewall 25 includes hardware and/or software components designed to prevent certain communications based on network policies. Firewall 25 may be a stand-alone component or implemented as dedicated software or hardware in a router, switch, server, or other network device.

In certain circumstances, computer 15(1) (or a user at computer 15(1)) may download or otherwise receive an unknown executable file or software, referred to simply herein as an unknown executable, from web server 45. Because there are a wide variety of executable malicious files or software (malware) that can attack modern computers, there is a constant danger that an unknown executable may pose a risk to a computer. Additionally, because malware is often designed to provide financial gain to the attacker, new malware is constantly produced and computing enterprises may be continually exposed to different types of attacks. Accordingly, as described further below, executable classification module 30 is a network security element that is configured to inspect unknown executable files (executables) and determine if the executable is malware (i.e., classify the executable and/or determine the likely behavior of the executable).

An executable file comprises data and executable sections of code. Additionally, there are various features/characteristics of the executable (e.g., imported function names and strings present within the file) that may be extracted from the executable. A conventional strategy for classifying an unknown executable is to first create a large list of feature sets/vectors (i.e., groupings of extractable features) from a training set of known executables, and to then perform an exhaustive search of all elements in the list to find examples that minimize a distance function between a feature set associated with the unknown executable and each member of the list. However, because a large number of samples is generally required (due to the large number of different types of malware), this process is time consuming and computationally expensive.

The executable classification techniques executed in FIG. 1 by module 30 are configured to use the first instructions that would be executed in an executable to index examples generated from a training set so that any nearest neighbor or probabilistic classification algorithm only considers a subset indexed by the first executable instruction bytes. More specifically, a data structure is generated where each node includes or otherwise represents an operation code (opcode) for beginning executable instructions from files in the training set. That is, the first instructions that would be executed in known executable files are used to populate the data structure so as to index feature vectors for the specific executable.

The instructions in the unknown executable are used to traverse the data structure, and compared to the operation codes in the data structure encountered during the traversal until a subset of executable files in the training set that have the same beginning operation codes as the unknown executable are identified. In other words, the instructions in the unknown executable are used to identify the longest matching sequence of entry point operation codes for files in the subset. After the subset of executables is identified, a feature set comparison is performed to determine if the unknown executable is malware or a safe file (i.e., non-malware). These techniques may have the advantage of being faster than conventional malware classification techniques as only a small subset are used for a feature set comparison. Additionally, the accuracy may improve because the identified subset that is automatically selected corresponds to examples generated by the same compiler/packer. Moreover, an immediate classification of malware or non-malware can be made if the longest matching subsequence is a safe file. In certain examples, the operands of the instruction are excluded from these operations.

In the example of FIG. 1, classification module 30 is a software element executed on security server 16 within computing enterprise 10. This implementation of classification module 30 is merely an example and the classification techniques may be implemented, for example, in a server within a cloud computing environment, at an edge device/server, a computer, etc.

Figure 2:
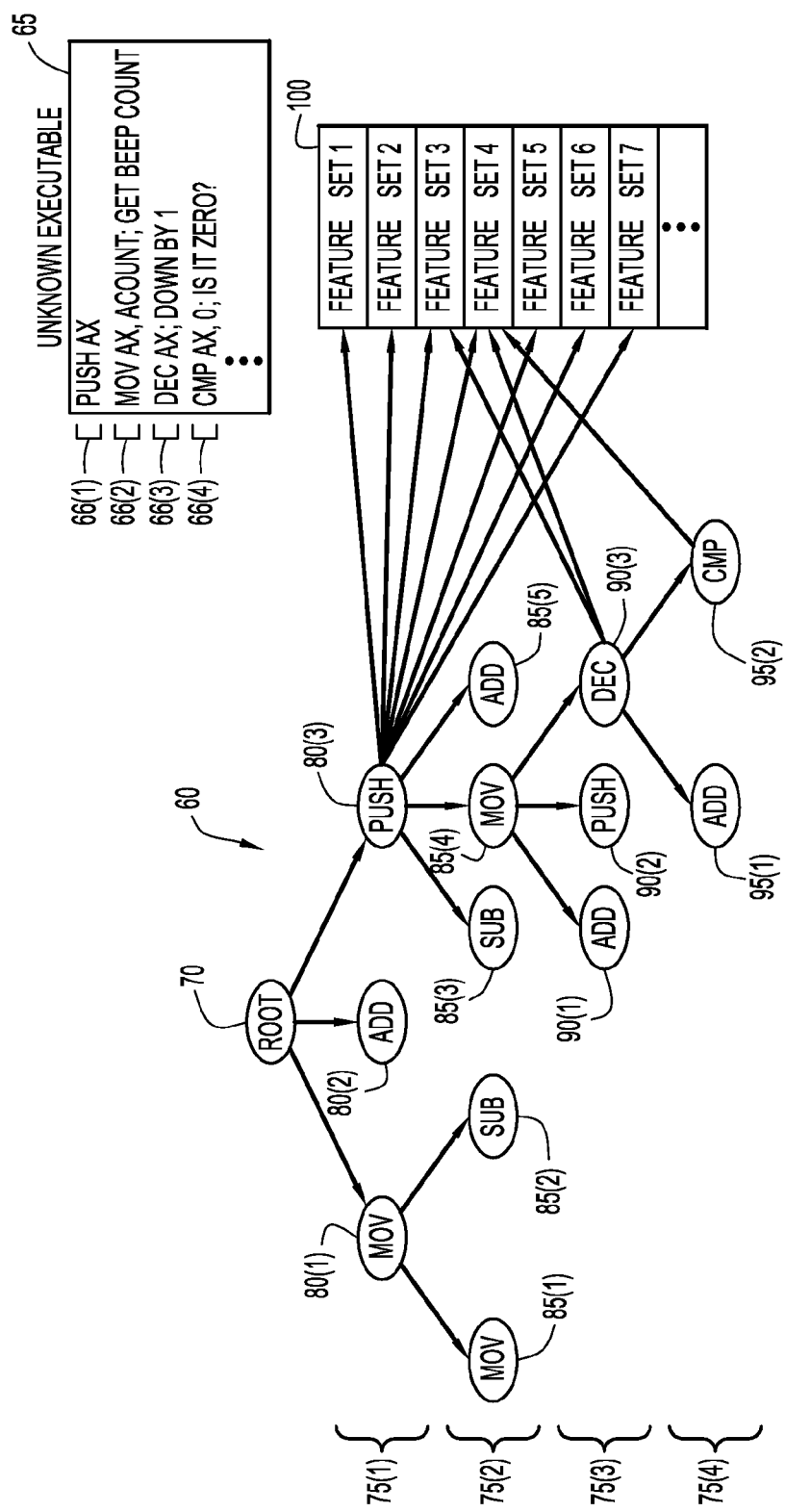
FIG. 2 is a schematic diagram illustrating the execution of an executable classification technique according to an example.

It is to be appreciated that the data structure used in the executable classification techniques may take a number of different forms. FIG. 2 is a specific example in which the data structure is implemented as a Trie data structure 60. Also illustrated in FIG. 2 is an example unknown executable 65 that may be classified using the Trie data structure 60. For ease of illustration, FIG. 2 is described with reference to only the operation codes corresponding to the first four executable instructions 66(1)-66(4) of unknown executable 65.

Trie data structure 60 has a root 70 and four hierarchical layers 75(1)-75(4). The layers 75(1)-75(4) each include a plurality of nodes each associated with a corresponding operation code extracted from known executables in an instruction set. It would be appreciated that only nodes that are relevant for understanding of the illustrated example are shown in FIG. 2 and that each layer may, in different arrangements, include additional nodes.

Illustrated in FIG. 2 are nodes 80(1), 80(2), and 80(3) in layer 75(1). Each of these nodes 80(1)-80(3) are sometimes referred to herein as entry nodes because they form the entry points (subsequent to root 70) into the Trie data structure 60. Entry nodes 80(1)-80(3) include operation codes that correspond to the first executable instructions in the known executables from the instruction set. That is, executable files include instructions that are executed and the operation codes of nodes 80(1)-80(3) correspond to the first instructions in the executable. In this example, node 80(1) includes the operation code "mov" (corresponding to a move instruction), node 80(2) includes the operation code "add" (corresponding to an add instruction), and node 80(3) includes the operation code "push" (corresponding to a push instruction).

The first executable instruction 66(1) of unknown executable 65 is a push instruction having a corresponding operation code "push." The operation code of first executable instruction 66(1) is compared to the operation codes of nodes 80(1)-80(3). In this example it is determined that the operation code of node 80(3) matches the operation code for instruction 66(1).

Shown in layer 75(2) are nodes 85(1) and 85(2) that depend from node 80(1). These nodes 85(1) and 85(2) include operation codes that correspond to the second executable instruction in known executables from the training set that have the first instruction of node 80(1). That is, in the illustrated example of FIG. 2, there are two or more known executables that have a "move" instruction as the first executable instruction. For each of these known executables that begin with the "move" instruction, the operation codes corresponding to the second executable instruction (i.e., the next sequential instruction that follows the "move" instruction) are extracted and used to populate the nodes of layer 75(2) that depend from node 80(1). In this case, the instruction set includes known executables that begin with the operation code combinations of move/move (i.e., the first "move" instruction is followed by a second "move" instruction) and move/sub (i.e., the first "move" instruction is followed by a "subtract" instruction).

Also shown in layer 75(2) are nodes 85(3), 85(4), and 85(5) that depend from node 80(2). These nodes 85(3), 85(4), and 85(5) include operation codes that correspond to the second executable instruction in known executables from the training set that have the first instruction of node 80(3). That is, in the illustrated example of FIG. 2, there are two or more known executables that have a "push" instruction as the first executable instruction. For each of these known executables that begin with the "push" instruction, the operation codes corresponding to the second executable instruction (i.e., the next sequential instruction that follows the "push" instruction) are extracted and used to populate the nodes of layer 75(2) that depend from node 80(3). In this case, the instruction set includes known executables that begin with the operation code combinations of push/sub (i.e., the first "push" instruction is followed by a "subtract" instruction), push/mov (i.e., the first "push" instruction is followed by a "move" instruction), and push/add (i.e., the first "push" instruction is followed by an "add" instruction).

As noted above, it was determined that the operation code corresponding to the first instruction 66(1) in the unknown executable 65 matched the operation code of node 80(3) (i.e., the first instruction in 66(1) is a "push" instruction). As such, the classification technique moves to node 80(3) where the operation code corresponding to second instruction 66(2) of unknown executable 65 is compared to the operation codes of nodes 85(3)-85(5) (i.e., the dependent nodes of node 80(3)). If a match is found, the classification technique moves to the node having the matching operation code. In this example, the second instruction 66(2) is a "move" instruction and a matching operation code is found at node 85(4).

Shown in layer 75(3) are nodes 90(1), 90(2), and 90(3) that depend from node 85(4). These nodes 90(1), 90(2), and 90(3) include operation codes that correspond to the third executable instruction in known executables in the training set that have the first instruction of node 80(3) and the second instruction of node 85(4). That is, in the illustrated example of FIG. 2, there are two or more known executables that have a "push" instruction as the first executable instruction, and a "move" instruction as the second executable instruction For each known executable that begins with the move/push instruction combination, the operation codes corresponding to the third executable instruction (i.e., the next sequential instruction that follows the "move" instruction) are extracted and used to populate the nodes of layer 75(3) that depend from node 85(4). In this case, the instruction set includes known executables that begin with the operation code combinations of push/move/add (i.e., the "move" instruction is followed by an "add" instruction), push/move/push (i.e., the "move" instruction is followed by a "push" instruction, and push/move/dec (i.e., the "move" instruction is followed by a "decrement" instruction).

It is to be appreciated that layer 75(3) may include nodes that depend from the other nodes 85(1), 85(2), 85(3), and 85(5). However, for ease of illustration, these nodes have been omitted from FIG. 2.

As noted above, it was determined that the operation code corresponding to the second instruction 66(2) in the unknown executable 65 matched the operation code of node 85(4) (i.e., the second instruction 66(2) is a "move" instruction). As such, the classification technique moves to node 85(4) where the operation code corresponding to the third instruction 66(3) of unknown executable 65 is compared to the operation codes of nodes 90(1)-90(3) (i.e., the nodes that depend from node 85(4)). If a match is found, the classification technique moves to the node having the matching operation code. In this example, the third instruction 66(3) is a "decrement" instruction and a matching operation code is found at node 90(3).

Shown in layer 75(4) are nodes 95(1) and 95(2) that depend from node 85(4). These nodes 95(1) and 95(2) include operation codes that correspond to the fourth executable instruction in known executables in the training set that have the first instruction of node 80(3), the second instruction of node 85(4), and the third instruction of node 90(3). That is, in the illustrated example of FIG. 2, there are two or more known executables that have a "push" instruction as the first executable instruction, a "move" instruction as the second executable instruction, and a "decrement" instruction as the third instruction. For each of the known executables that begin with the push/move/decrement instruction combination, the operation codes corresponding to the fourth executable instruction (i.e., the next sequential instruction that follows the "decrement" instruction) are extracted and used to populate the nodes of layer 75(4) that depend from node 90(3). In this case, the instruction set includes known executables that begin with the operation code combinations of push/move/dec/add (i.e., the "decrement" instruction is followed by an "add" instruction) or push/move/dec/cmp (i.e., the "decrement" instruction is followed by a "compare" instruction).

It is to be appreciated that layer 75(4) may include nodes that depend from the other nodes 90(1) and 90(2). However, for ease of illustration, these nodes have been omitted from FIG. 2.

As noted above, it was determined that the operation code corresponding to the third instruction 66(3) in the unknown executable 65 matched the operation code of node 90(3) (i.e., the third instruction 66(3) is a "decrement" instruction). As such, the classification technique moves to node 90(3) where the operation code corresponding to the fourth instruction 66(4) of unknown executable 65 is compared to the operation codes of nodes 95(1) and 95(2) (i.e., the nodes that depend from node 90(3)). If a match is found, the classification technique moves to the node having the matching operation code. In this example, the fourth instruction 66(4) is a "compare" instruction and a matching operation code is found at node 95(2).

The process described above for instructions 66(1)-66(4) continues until the matching combination of operation codes is found, or the process reaches a predetermined comparison end point. A predetermined endpoint may be reached when a string of, for example, 100, 200, or other number of matching operation codes is found.

A feature of the Trie data structure 60 is that each node is associated with feature sets of the known executables that correspond to that node. For example, as shown by the arrows in FIG. 2, node 80(3) is associated with seven (7) feature sets that are shown in table 100. These seven features are sets of features that have been extracted from known executables that begin with the "push" command. Features sets may include, for example, imported function names, strings present within the file, etc. Similarly, node 85(4) is associated with three feature sets (feature set 2, feature set 3, and feature set 4). For ease of illustration, the arrows from node 85(4) to the associated feature sets have been omitted from FIG. 2. Additionally, node 90(3) is associated with two feature sets (feature set 3 and feature set 4), and node 95(2) is associated with one feature set (feature set 4).

A purpose of the classification techniques is to determine if unknown executable 65 is malware or if the executable is safe for execution (i.e., a safe file or non-malware). The first step in this process is, as described above, to determine the longest sequence of operation codes in the Trie data structure that match the operational codes of the beginning sequence of instructions in the unknown executable 65. After the longest match is determined, a search is performed on the feature list(s) that are associated with the node where the longest match terminated. This search is, in general, a distance function-based search that determines which feature set or sets associated with the node are similar to a feature set extracted from the unknown executable. In other words, a "nearest neighbor match" is performed (using some type of distance function) that determines which executable files associated with the node (i.e., known files that have the same beginning string of instructions) have features that match, or are different from, the features of the unknown executable. Using this matching, it can be determined if the unknown executable is likely malware (i.e., the unknown executable has features similar to malware) or is likely safe (i.e., the unknown executable has features similar to safe executable files).

There is a number of different distance functions that may be used to perform the above noted nearest neighbor match. These distance functions include, for example, Euclidean distance, edit distance, etc. Such distance functions are known in the art and are not described in detail herein.

In certain circumstances, the classification technique also generates a confidence measure that indicates how likely it is that the unknown executable 65 is either malware or a safe file. That is, it may be possible to generate a metric that represents how closely the features of the unknown executable match the features of malware or the features of a safe file. In other words, statistical analysis may be performed on the results of the distance function to determine if there is significance to the match(s). Instead of having a binary result (yes or no malware), it is possible to indicate how malicious the unknown executable may be. In one example, the generated confidence measure is a numerical value in the range of 0 to 1, where 0 indicates that there is no confidence in the decision (i.e., the distance function indicated that the features of the unknown executable are far apart from the nearest neighbors) and 1 indicates complete confidence in the decision (i.e., the distance function indicated that the features of the unknown executable are closely matching the nearest neighbors). The confidence measure may be a function of the closest n matches and the total matches. As would be appreciated, the confidence measure may alternatively expressed as a percentage that provides an indication that the unknown executable has features that are a percentage match (e.g., 50% match, 75% match, 90% match, etc.) to the known malware or to known safe files.

There are various techniques to generate these metrics, such as, for example, through the use of a Graph Edit Distance function. It would be appreciated that alternative confidence measures may be used in different examples. A high confidence measure for malware will be generated when the features of the unknown executable are close to features of malware, but a far distance from features of safe files. Conversely, a low confidence measure for malware will be generated when the features of the unknown executable are close to features of malware, but also close to features of safe files.

The Trie data structure is a way of identifying executables that are grouped naturally together and the longer the matching sequence, the better the resulting comparison. For example, if the comparison resolves down to one executable (i.e., the exact match is in the data structure), it will identify exactly what the file is and whether it is malware or a safe file. However, if only a short match is identified, there are more features to search and the space will be noise, thus the confidence is likely to be low.

In the example of FIG. 2, the longest match was at node 95(2), which is associated with feature set 4. Because the training set used to generate Trie data structure 60 includes executable files that are malware as well as executable files that are safe, the feature set 4 may be features of either malware or a safe file. A distance function is performed to determine how closely the features extracted from unknown executable 65 match feature set 4. Depending on whether feature set 4 is associated with malware or a safe file, and depending on how closely the distance function matched the extracted feature set to feature set 4, a determination can be made if the unknown executable 65 is malware or if the file is safe for execution.

As noted, the example of FIG. 2 terminates at a node where only one feature set (feature set 4) is used for comparison. In different arrangements, the longest sequence match may terminate at a node that includes more than one feature set. For example, in one arrangement the longest match may be at node 85(4) where there are five associated feature sets. In such an example, a distance function determines how closely the extracted features of unknown executable 65 match each of the different feature sets. Using this information, a determination may be made as to which feature set or sets are the closest match and, ultimately, whether the unknown executable is likely malware or a safe file.

The comparison process will take longer when more feature sets are associated with a node. Similarly, because the training set includes malware as well as safe files, the unknown executable may partially match some malware as well as some safe files. In such cases, the above noted confidence measure may take this into account and accordingly lower the confidence measure when the unknown executable matches both malware and safe files. The magnitude of such lowering of the confidence measure would depend on the particular circumstances and how closely the extracted feature set matches each of the known malware and safe files.

In certain examples, when the unknown executable 65 is compared to Trie data structure 60 an exact match may be found in the data structure. In such cases, the unknown executable 65 will be definitively classified as either malware or a safe file, depending on which file it is exactly matched.

In summary of the above, the classification technique operates on the beginning (first) instructions of an unknown executable in order to identify the longest matching sequence. This match corresponds to similar executables that have been compiled by the same compiler/packer, and a distance function can be executed to determine how closely the unknown executable matches the similar executables. This enables a determination of whether the unknown executable is malware or a safe file.

Figure 3:
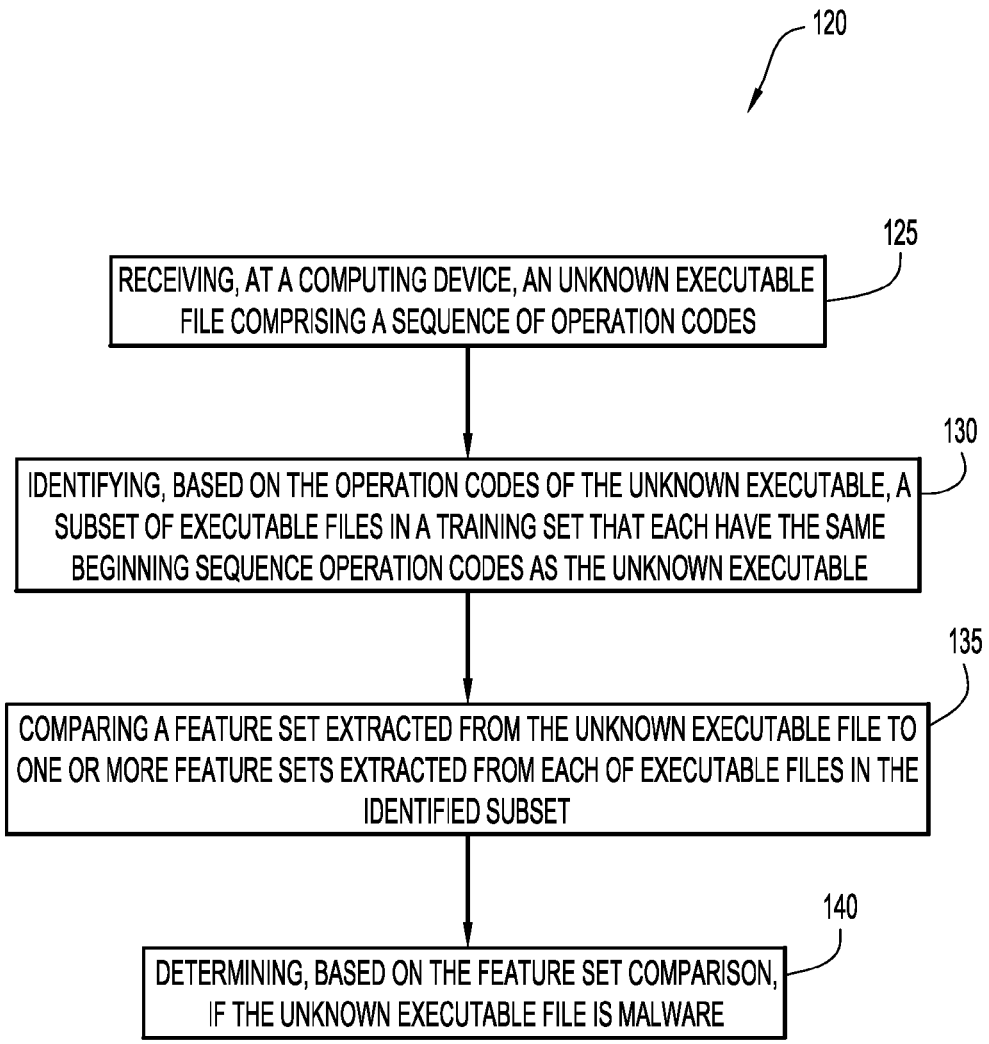
FIG. 3 is a high-level flowchart illustrating a manner of classifying an executable in accordance with an example.

FIG. 3 is a high-level flowchart of a method 120 implemented in accordance with an example executable classification technique. Method 120 begins at 125 where an unknown executable file is received at a computing device. The unknown executable file comprises a sequence of operation codes that correspond to the executable instructions of the file. At 130, the operation codes of the unknown executable are used to identify a subset of executable files in a training set that each has the same beginning sequence operation codes as the unknown executable. In one example, this identification includes sequentially comparing the sequence of operation codes of the unknown executable file to operation codes of nodes of a data structure (e.g., Trie data structure) in order to identify a subset of executable files in a training set that each has the same beginning sequence of operation codes. At 135, a feature set extracted from the unknown executable file is compared to one or more feature sets extracted from each of executable files in the identified subset. At 140, a determination is made, based on the feature set comparison, as to whether the unknown executable file is malware or if the unknown executable is a safe file.

Figure 4:
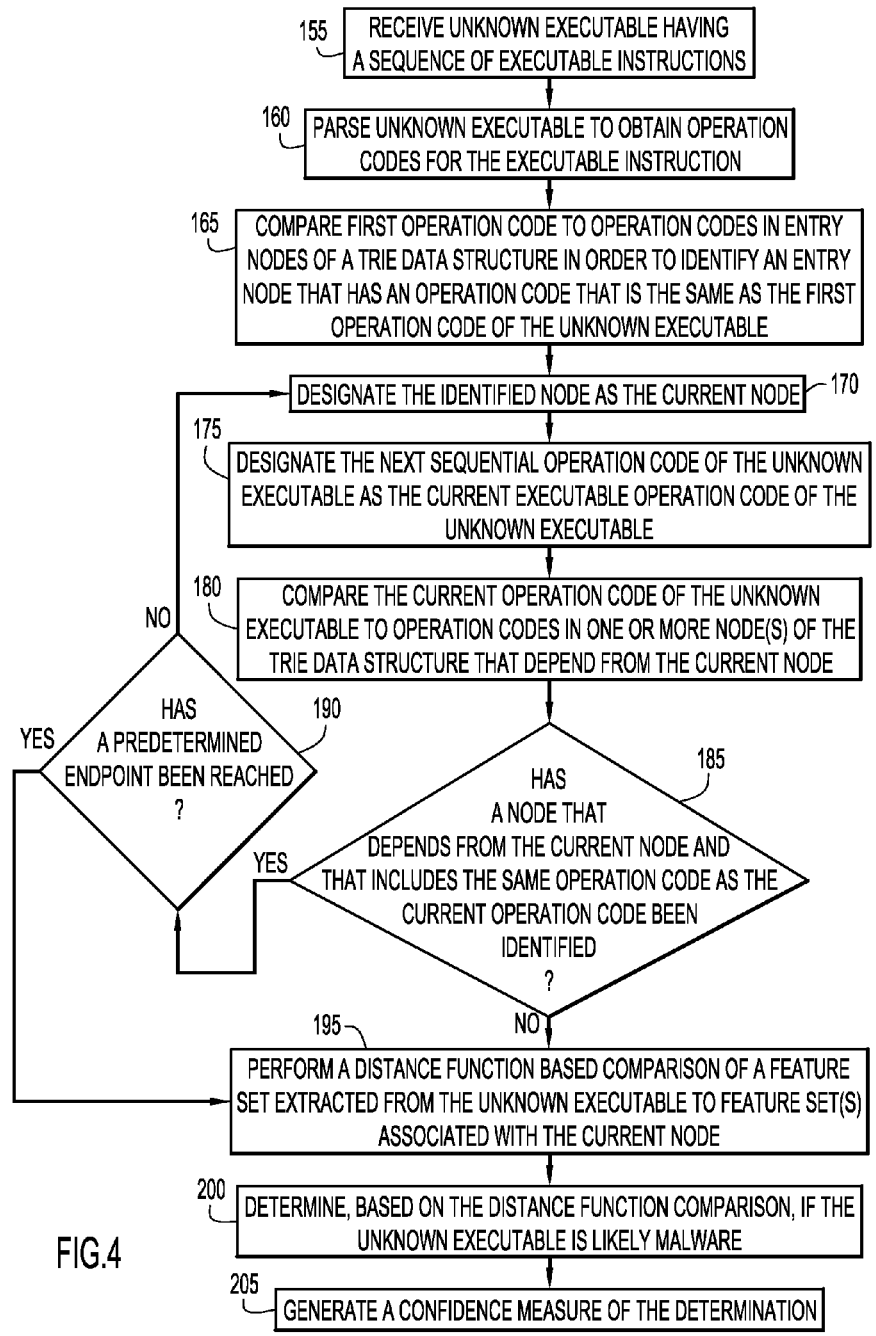
FIG. 4 is detailed flowchart illustrating a manner of classifying an executable as malware according to an example.

FIG. 4 is a flowchart of a method 150 implemented in accordance with another example Trie-based executable classification technique. Method 150 is a more detailed implementation of method 120 of FIG. 3. Method 150 begins at 155 where an unknown executable is received. The unknown executable comprises a sequence of executable instructions. At 160, the unknown executable is parsed or otherwise disassembled to obtain operation codes for each of the executable instructions. At 165, the first operation code (i.e., the operation code corresponding to the first executable instruction) is compared to operation codes in entry nodes of a Trie data structure. This comparison is performed in order to identify an entry node that has an operation code that is the same as the first operation code of the unknown executable.

At 170, the identified node is made the current node. Similarly, at 175, the next sequential operation code of the unknown executable is made the current executable operation code of the unknown executable.

At 180, the current operation code of the unknown executable is compared to the operation codes in one or more node (s) of the Trie data structure that depend from the current node. At 185, a determination is made as to whether a node has been identified that depends from the current node and that includes the same operation code as the current operation code. If such a node as been identified, a determination is made at 190 as to whether a predetermined comparison endpoint as been reached. If such an endpoint has not been reached, the method 150 returns to 170 where, as noted above, the identified node is made the current node. The operations of steps 170, 175, 180, 185, and 190 are repeated until a determination is made at 185 that no dependent node has an operation code that matches the current operation code, or a determination is made at 190 that the predetermined endpoint has been reached.

When no dependent node has an operation code that matches the current operation code or the predetermined endpoint has been reached, method 150 proceeds to 195. At 195, a distance function-based comparison is performed to compare a feature set extracted from the unknown executable to feature sets associated with the current node. At 200, a determination is made, based on the results of the distance function comparison, if the unknown executable is likely malware or if the unknown executable is likely a safe file. In this example, a confidence measure of the malware determination is made at 205.

Figure 5:
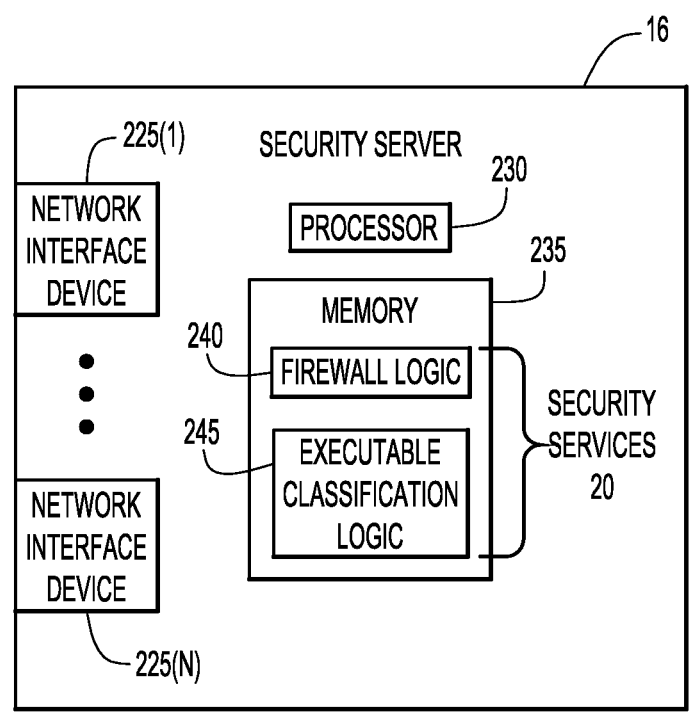
FIG. 5 is block diagram of a security server configured to execute executable classification techniques according to an example.

FIG. 5 illustrates further details of security server 16 of FIG. 1. Security server 220 comprises a plurality of network interface devices 225(1)-225(N), a processor 230, and a memory 235. Memory 235 comprises firewall logic 240 and executable classification logic 245. As such, FIG. 5 illustrates an example in which firewall 25 (shown in FIG. 1) and executable classification module 30 (also shown in FIG. 1) are implemented as software modules on a server (e.g., firewall logic 240 and executable classification logic 245, respectively).

Memory 235 may comprise read only memory (ROM), random access memory (RAM), magnetic disk storage media devices, optical storage media devices, flash memory devices, electrical, optical, or other physical/tangible memory storage devices. The processor 230 is, for example, a microprocessor or microcontroller that executes instructions for the firewall logic 240 and executable classification logic 245. Thus, in general, the memory 235 may comprise one or more tangible (non-transitory) computer readable storage media (e.g., a memory device) encoded with software comprising computer executable instructions and when the software is executed (by the processor 230) it is operable to perform the operations described herein in connection with the executable classification techniques.

The above description is intended by way of example only.

What is claimed is:

1. A method comprising:
   receiving, at a computing device, an unknown executable file comprising a sequence of operation codes;
   sequentially comparing a beginning sequence of the operation codes of the unknown executable file to hierarchical layers of operation codes in a Trie data structure in order to identify a subset of executable files in a training set that each has the same beginning sequence of operation codes as the unknown executable;
   comparing a feature set extracted from the unknown executable file to one or more feature sets extracted from each of executable files in the identified subset; and
   determining, based on the feature set comparison, whether the unknown executable file is malware.

2. The method of claim 1, wherein sequentially comparing the beginning sequence of operation codes of the unknown executable file to operation codes of data structure comprises:
   (1) comparing a first operation code in the beginning sequence of operation codes to operation codes in entry nodes of the Trie data structure in order to identify an entry node that has an operation code that is the same as the first operation code;
   (2) designating the identified node as the current node;
   (3) designating a next sequential operation code in the beginning sequence of operation codes as the current operation code;
   (4) comparing the current operation code to operation codes in one or more nodes of the Trie data structure that depend from the current node in order to identify a dependent node that has an operation code that is the same as the current operation code;
   (5) repeating operations (2)-(4) if the current operation code matches an operation code in any of the dependent nodes.

3. The method of claim 1, wherein comparing a feature set extracted from the unknown executable file to one or more feature sets extracted from each of executable files in the identified subset comprises:
   performing a distance function-based comparison of the extracted feature set to the one or more feature sets extracted from each of executable files in the identified subset.

4. The method of claim 3, wherein performing a distance function-based comparison comprises:
   performing a Euclidian distance function to determine how closely the extracted feature set matches the feature sets extracted from each of executable files in the identified subset.

5. The method of claim 1, further comprising:
   generating a confidence measure of the determination of whether the unknown executable file is malware.

6. The method of claim 5, wherein generating a confidence measure comprises:
   generating a percentage representing the likelihood that the unknown executable file is malware.

7. The method of claim 1, further comprising:
   parsing the received executable file to obtain the list of operation codes corresponding to executable instructions of the received executable file.

8. One or more computer readable storage media encoded with software comprising computer executable instructions and when the software is executed operable to:
   receive, at a computing device, an unknown executable file comprising a sequence of operation codes;
   sequentially compare a beginning sequence of the operation codes of the unknown executable file to hierarchical layers of operation codes in a Trie data structure in order to identify a subset of executable files in a training set that each has the same beginning sequence operation codes as the unknown executable;
   compare a feature set extracted from the unknown executable file to one or more feature sets extracted from each of executable files in the identified subset; and
   determine, based on the feature set comparison, whether the unknown executable file is malware.

9. The computer readable storage media of claim 8, wherein the instructions operable to sequentially compare the beginning sequence of operation codes of the unknown executable file to operation codes of nodes of the data structure comprise instructions operable to:
   (1) compare a first operation code in the beginning sequence of operation codes to operation codes in entry nodes of the Trie data structure in order to identify an entry node that has an operation code that is the same as the first operation code;
   (2) designate the identified node as the current node;
   (3) designate a next sequential operation code in the beginning sequence of operation codes as the current operation code;
   (4) compare the current operation code to operation codes in one or more nodes of the Trie data structure that depend from the current node in order to identify a dependent node that has an operation code that is the same as the current operation code;
   (5) repeat operations (2)-(4) if the current operation code matches an operation code in any of the dependent nodes.

10. The computer readable storage media of claim 8, wherein the instructions operable to compare a feature set extracted from the unknown executable file to one or more feature sets extracted from each of executable files in the identified subset comprise instructions operable to:
    perform a distance function-based comparison of the extracted feature set to the one or more feature sets extracted from each of executable files in the identified subset.

11. The computer readable storage media of claim 10, wherein the instructions operable to perform a distance function-based comparison comprise instructions operable to:

perform a Euclidian distance function to determine how closely the extracted feature set matches the feature sets extracted from each of executable files in the identified subset.

12. The computer readable storage media of claim 8, further comprising instructions operable to:

generate a confidence measure of the determination of whether the unknown executable file is malware.

13. The computer readable storage media of claim 12, wherein the instructions operable to generate a confidence measure comprise instructions operable to:

generate a percentage representing the likelihood that the unknown executable file is malware.

14. The computer readable storage media of claim 8, further comprising instructions operable to:

parse the received executable file to obtain the list of operation codes corresponding to executable instructions of the received executable file.

15. An apparatus comprising:

a plurality of network interface devices, wherein a first network interface device is configured to receive an unknown executable file comprising a sequence of operation codes;

a memory comprising operation codes populated from a training set; and a processor configured to:

sequentially compare a beginning sequence of the operation codes of the unknown executable file to hierarchical layers of operation codes in a Trie data structure in order to identify a subset of executable files in a training set that each has the same beginning sequence operation codes as the unknown executable, compare a feature set extracted from the unknown executable file to one or more feature sets extracted from each of executable files in the identified subset, and determine, based on the feature set comparison, whether the unknown executable file is malware.

16. The apparatus of claim 15, wherein to sequentially compare the beginning sequence of operation codes of the unknown executable file to operation codes of nodes of the data structure, the processor is configured to:

(1) compare a first operation code in the beginning sequence of operation codes to operation codes in entry nodes of the Trie data structure in order to identify an entry node that has an operation code that is the same as the first operation code;

(2) designate the identified node as the current node;

(3) designate a next sequential operation code in the beginning sequence of operation codes as the current operation code;

(4) compare the current operation code to operation codes in one or more nodes of the Trie data structure that depend from the current node in order to identify a dependent node that has an operation code that is the same as the current operation code;

(5) repeat operations (2)-(4) if the current operation code matches an operation code in any of the dependent nodes.

17. The apparatus of claim 15, wherein to compare a feature set extracted from the unknown executable file to one or more feature sets extracted from each of executable files in the identified subset, the processor is configured to perform a distance function-based comparison of the extracted feature set to the one or more feature sets extracted from each of executable files in the identified subset.

18. The apparatus of claim 17, wherein to perform the distance function-based comparison, the processor is configured to perform a Euclidian distance function to determine how closely the extracted feature set matches the feature sets extracted from each of executable files in the identified subset.

19. The apparatus of claim 15, wherein the processor is further configured to generate a confidence measure of the determination of whether the unknown executable file is malware.

20. The apparatus of claim 19, wherein the processor is configured to generate a percentage representing the likelihood that the unknown executable file is malware.

\* \* \* \* \*